R. TAYLOR.
REVERSING GEAR PARTICULARLY APPLICABLE TO CARDING ENGINES.
APPLICATION FILED JAN. 5, 1921.

1,410,966.

Patented Mar. 28, 1922.
4 SHEETS—SHEET 1.

INVENTOR:
Robert Taylor
By Wm Wallace White
ATT'Y

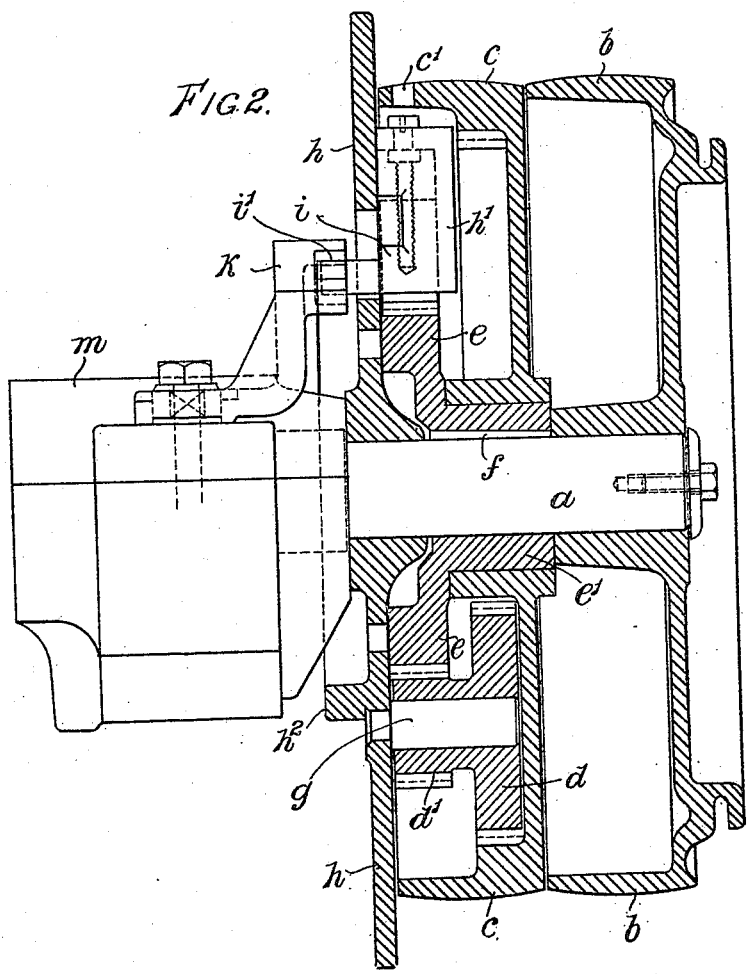

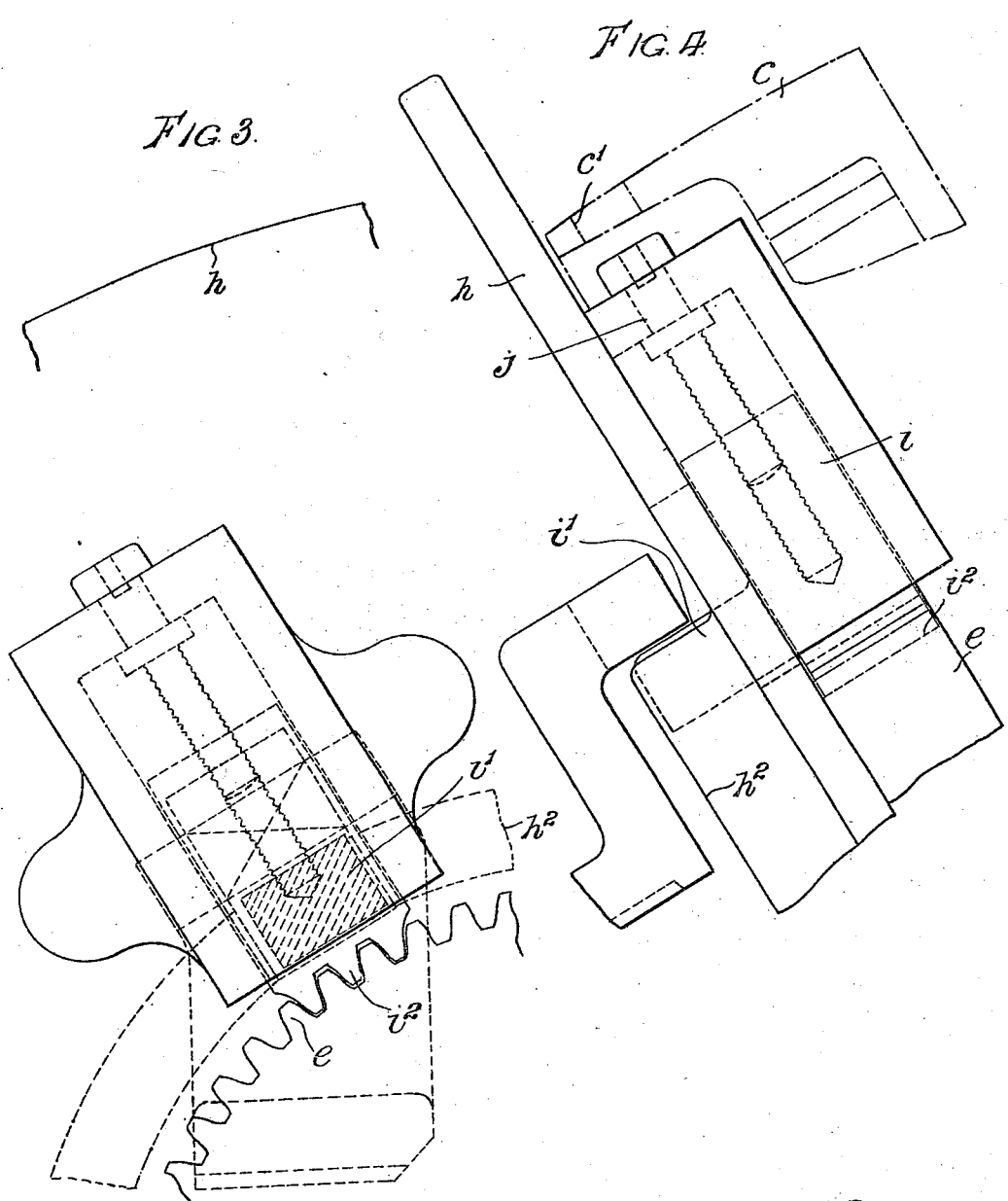

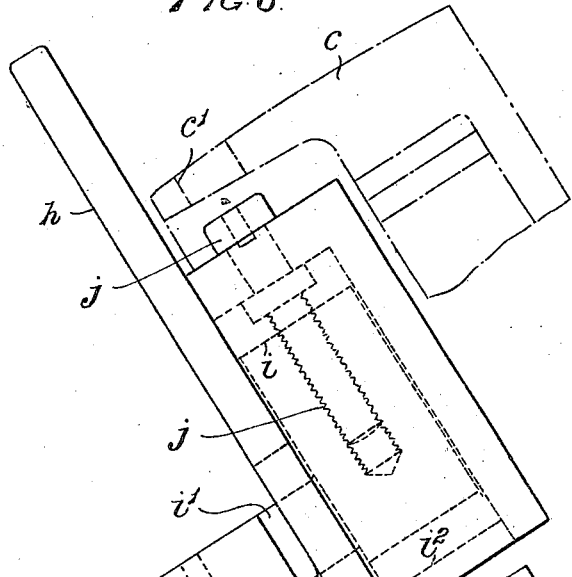
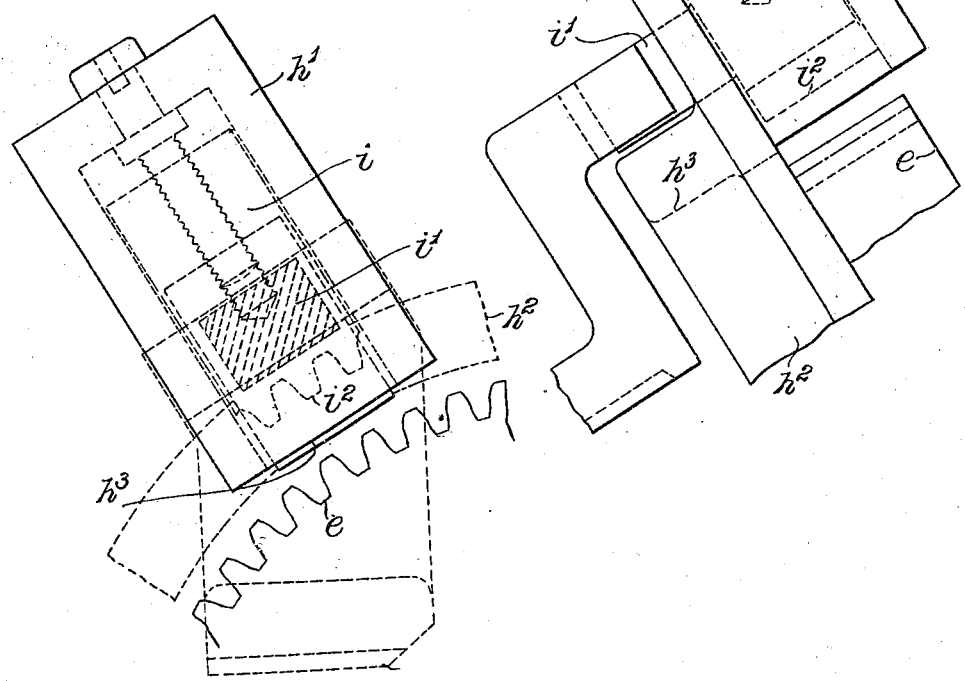

UNITED STATES PATENT OFFICE.

ROBERT TAYLOR, OF OLDHAM, ENGLAND.

REVERSING GEAR PARTICULARLY APPLICABLE TO CARDING ENGINES.

1,410,966.

Specification of Letters Patent. Patented Mar. 28, 1922.

Application filed January 5, 1921. Serial No. 435,174.

*To all whom it may concern:*

Be it known that I, ROBERT TAYLOR, a subject of the King of Great Britain, residing at Soho Iron Works, Oldham, in the county of Lancaster, England, have invented new and useful Improved Reversing Gear Particularly Applicable to Carding Engines, of which the following is a specification.

My invention relates to an improved reversing gear particularly applicable to carding engines for reversing the cylinder when grinding.

In the specification to British Letters Patent No. 28009 of 1912 such a reversing gear is described comprising a driving pulley enclosing the gearing and mounted on a driven shaft side by side with the usual loose pulley. Teeth on the inside of the driving pulley mesh with the larger series of compound gears mounted on studs carried by a revoluble disc on the driven shaft, while the smaller gears mesh with a gear fixed on the said shaft. For normal driving, the gearing is locked solid by plugs which screw through holes in the disc and engage the gear which is fixed on the driven shaft. To effect reversal, the plugs are withdrawn and the disc is held against rotation by a sliding pedestal cap. In a modified arrangement, the plugs are replaced by a radially sliding toothed grip or rack, which engages the teeth of a wheel fixed on the shaft and so locks the wheel and disc together. The pedestal cap in this arrangement is fixed and carries screws, which can engage and hold the disc.

My invention relates to this patented type of reversing gear and particularly to the modified form thereof, and consists in certain structural improvements and arrangements which I will describe with reference to the accompanying four sheets of drawings, in which—

Fig. 1 is a side elevation.

Fig. 2 a vertical section through the driving pulley.

Figs. 3 and 4 are two detail views showing the lug on the toothed slide engaged with a slot or recess in the guard ring cast on the revoluble disc and the teeth in mesh with the gear fixed on the driven shaft.

Figs. 5 and 6 are similar views to Figs. 3 and 4 respectively but showing the lug in the slot in the bracket on the pedestal and the toothed slide raised and disengaged from the gear on the driven shaft.

Figure 1:
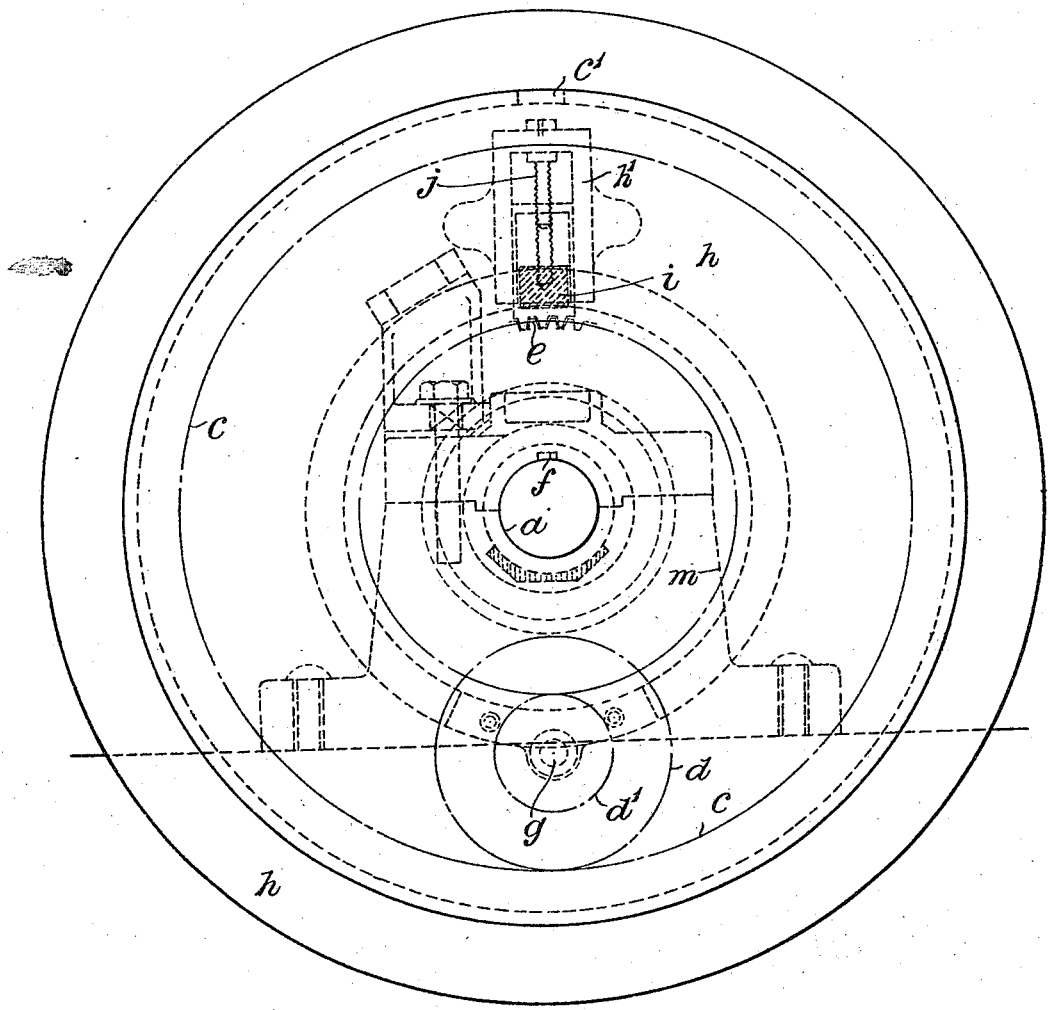

In these views—$a$ designates the driven shaft; $b$ the loose pulley; $c$ the driving pulley formed with internal teeth; $d$ $d'$ one of the compound gears of which the larger gear $d$ meshes with the internal teeth of the pulley $c$ and the smaller gear $d'$ meshes with a spur wheel $e$ fixed by a key $f$ or equivalent on the shaft $a$. Each compound gear $d$ $d'$ is mounted on a stud $g$ carried by a revoluble disc $h$ loose upon the shaft $a$, and the driving pulley $c$ is mounted loose upon an extended boss $e'$ on the spur wheel $e$ as in the original form of the aforesaid patented reversing gear.

According to my invention I dispense with the screws or plugs employed in the first arrangement of the original type or the radially sliding grip or rack and the independently operated screw in the pedestal cap of the second arrangement and instead I substitute a combined radially sliding toothed rack and lug or detent to enable the reversing gear to be locked up to drive the shaft for the normal or carding direction or to be unlocked for reversal by a single movement of this combined part.

To accomplish this I fix a bracket $h'$ on the side of the disc $h$ and in this bracket $h'$ I fit the combined radial slide $i$ and lug $i'$ which passes through a radial slot in the disc $h$. The slide $i$ is formed with rack teeth $i^2$ on its underside and the combined part is capable of being moved into the two positions shown in Figs. 3 and 4 and Figs. 5 and 6 respectively by means of a screw $j$ actuated by a screw driver or key through a hole $c'$ in the driving pulley $c$ after the latter has been brought into the proper position to enable this to be effected.

I cast or fix a guard ring $h^2$ upon the opposite side of the disc $h$ and in this ring I form a slot or opening $h^3$ to permit the passage of the lug $i'$ and I also fix a slotted bracket $k$ on the pedestal $m$ to receive the lug $i'$ when the combined part $i$ is in its raised position.

From the foregoing description it will be understood that when the parts are in the relative positions indicated by Figs. 1 to 4, with the rack teeth $i^2$ on the combined part $i$ in mesh with the teeth on the gear $e$ the several gears will be prevented from independent rotation and the whole mechanism will be locked solid, and consequently a direct forward drive from the pulley $c$ will be imparted to the shaft $a$. During this forward drive the lug $i'$ will rotate under the cover afforded by the guard ring $h^2$ whereby risk of accident is obviated. When however the combined part $i$ is raised into the position indicated in Figs. 5 and 6, the teeth $i^2$ are withdrawn from the gear $e$ and the lug $i'$ is brought into the slot in the stationary bracket $k$ fixed on the pedestal $m$, and consequently the disc $h$ is prevented from revolving, so that as the driving pulley $c$ rotates, it rotates the compound gears $d$ $d'$ and drives the gear $e$ and shaft $a$ in the reverse direction.

Having now particularly described and ascertained the nature of my said invention and in what manner the same is to be performed I declare that what I claim is:—

1. In a device of the class described, the combination of a driving gear and a driven element, a gear carried by said driven element for rotation therewith, a disk in coaxial relation with said driven element and rotatable independently thereof, intermediate gearing carried by said disk in mesh with said second gear and said driving gear, a member carried by said disk and slidable radially thereof, said member being adapted when slid in one direction to lock the driven element for rotation with the driving gear as a unit, and a stationary member cooperating with said slidable member when slid in the opposite direction for holding said disk against rotation thereby to cause rotation of the driven element in the direction opposite from that of the driving gear.

2. In a device of the class described, the combination of a driving pulley and a driven shaft, a gear keyed to said shaft for rotation therewith, a disk mounted on said shaft for rotation independently thereof, gearing carried by said disk in mesh with said shaft gear, an internal gear carried by said pulley in mesh with said gearing, a member carried by said disk and slidable radially thereof for engaging the teeth of said shaft gear when slid in one direction thereby to lock the same for rotation with said pulley as a unit, said member having a lug extending through said disk, and a stationary member cooperating with said lug when the slidable member is slid in the opposite direction, thereby to hold said disk against rotation and permit rotation of the shaft gear in the direction opposite from that of the driving pulley.

In testimony whereof I have signed my name to this specification.

ROBERT TAYLOR.